United States Patent [19]
Roberts et al.

[11] 3,791,694
[45] Feb. 12, 1974

[54] CHILD RESTRAINING SEAT ASSEMBLY

[75] Inventors: Verne L. Roberts, Southfield; James H. McElhaney, Ann Arbor, both of Mich.

[73] Assignee: American Safety Equipment Corporation, Encino, Calif.

[22] Filed: Feb. 18, 1972

[21] Appl. No.: 227,469

[52] U.S. Cl.............................. 297/250, 297/389
[51] Int. Cl............................................. A47d 1/10
[58] Field of Search... 297/250, 253, 254, 216, 389, 297/385, 384, 388

[56] References Cited
UNITED STATES PATENTS

| | | | |
|---|---|---|---|
| 3,515,431 | 6/1970 | Grady | 297/250 |
| 3,606,453 | 9/1971 | Cicero | 297/254 |
| 3,512,830 | 5/1970 | Norman | 297/250 |
| 3,162,864 | 12/1964 | Ouellette | 297/385 X |
| 3,583,764 | 6/1971 | Lohr | 297/389 |
| 1,898,090 | 2/1933 | Lethern | 297/389 |
| 3,325,213 | 6/1967 | Levy | 297/250 |
| 3,301,594 | 1/1967 | Pukish | 297/389 |
| 3,709,558 | 1/1973 | Jakob | 297/389 |

*Primary Examiner*—Francis K. Zugel

[57] ABSTRACT

The seat assembly includes an inverted T shaped plate with two upper slots, opposite side slots and a lower slot; a molded plastic child seat rivited to the plate for placement on a vehicle seat; a crotch belt with an end buckle extending through the bottom slot to be mounted to the plate; a continuous right and left combination shoulder and lap strap extending through the remaining slots to be mounted to the plate for locating intermediate buckles thereon for joining to the buckle on the crotch strap so that the straps will restrain a child in the seat; and a pair of anchor belts extending through the side slots to be mounted to the plate for being joined to the seat belts of the vehicle whereby the restraining load of the straps is transferred via the plate to the anchor belts without being applied to the plastic seat.

3 Claims, 3 Drawing Figures

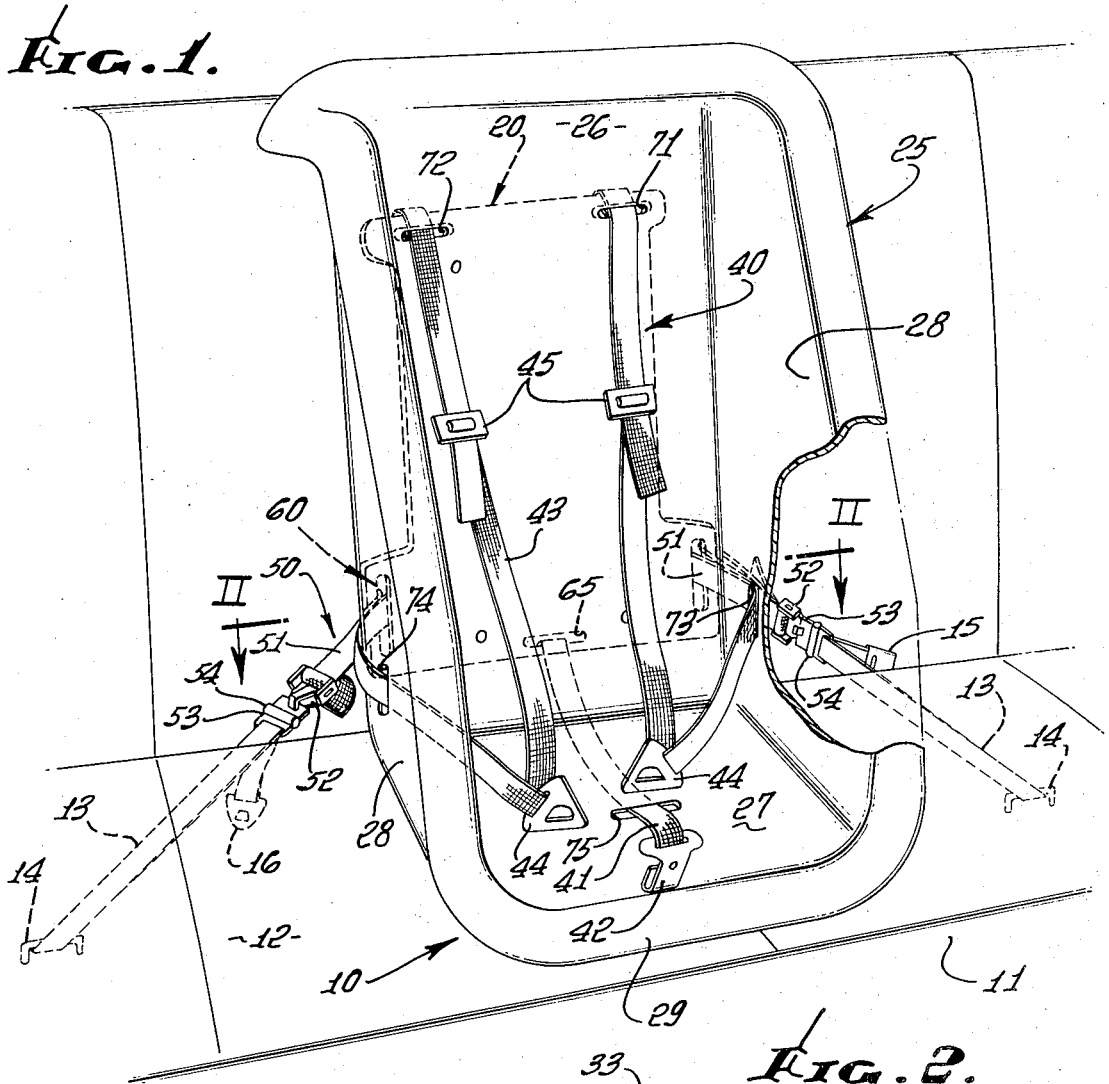
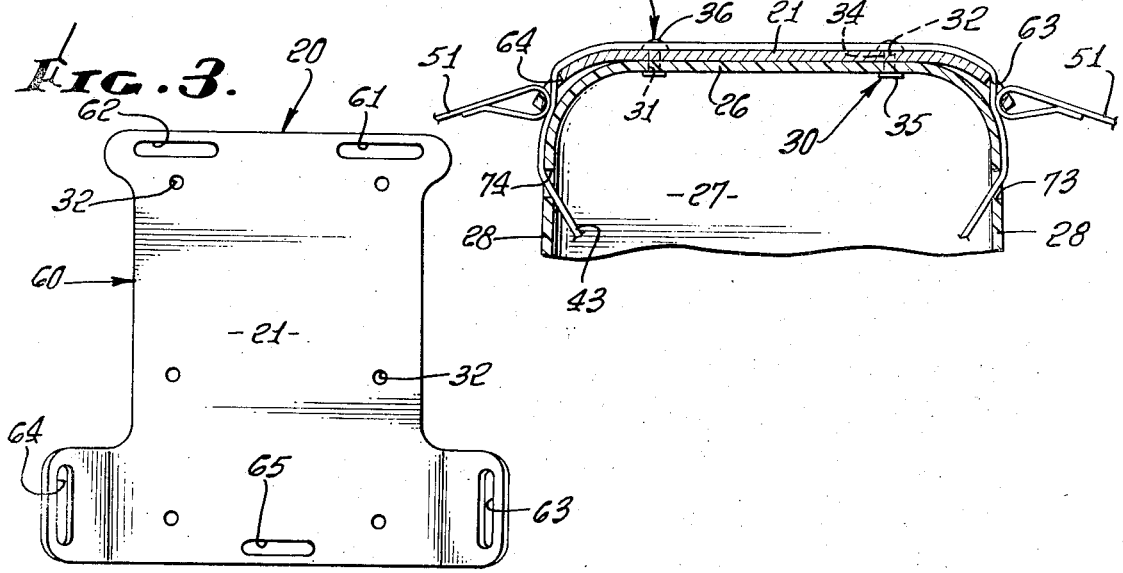

CHILD RESTRAINING SEAT ASSEMBLY

BACKGROUND OF THE INVENTION

This invention relates to child safety harnesses and seats and more particularly to a body restraining seat construction mounting a safety belt or harness.

Child safety seats positioned on the seat of a vehicle with associated vehicle anchored safety harnesses have heretofore been developed to hold a child, seated therein, against being thrown forward and injured in the event of sudden vehicle deceleration. In many of these prior art safety seats, the restraining load is transferred through the seat to associated vehicle anchor means or safety belts. In other prior art safety seats, the child restraining harness was attached directly to the vehicle mounted safety belts apart from the associated seat. The former construction requires a very strong seat which is usually very heavy as well, while the latter construction provides undesirable loading characteristics to both the child and the seat. Lightweight child safety seats can be inexpensively molded from plastic. However, such seats are not strong enough to withstand the restraining load that would be placed on them by the former construction. Thus, the latter construction would seem to be required in order to be able to utilize the plastic child seat as a child safety seat. However, it would be desirable to have the child safety harness associated with the lightweight plastic seat, for ease of handling of the various belts and straps, and also obtain a more desirable load distribution of forces transmitted from the child harness to the vehicle associated anchor means.

BRIEF DESCRIPTION OF THE INVENTION

Therefore, it is the primary object of this invention to provide a novel child safety seat assembly which has none of the afore-described disadvantages of the prior art constructions.

Other and additional objects of this invention are to provide such an assembly which includes a lightweight, inexpensive molded, plastic child seat with a load transmitting seat backing member to transfer the child restraining load of the harness to the vehicle-mounted anchor means; to provide such an assembly which has five restraint straps about the child which are anchored to said member; to provide such an assembly which has anchor straps connected from the backing member to the vehicle mounted anchor fittings or safety belts; and to provide such an assembly which is lightweight, which is easy to assembly and adjust, and which is effective to restrain a child therein against injury during a vehicle impact.

Generally stated, the improved child restraining seat assembly for use in a vehicle having a seat provided therein of the present invention includes seat means for placement on the vehicle seat, restraint means for wrapping about the child and for being secured together to hold the child in the seat means and anchor means for connection with the vehicle, with the improvement comprising the provision of a separate seat backing or structural member having means for connecting the vehicle anchor means and the restraint means thereto whereby the restraining load of the restraint means is transferred via the backing plate or structural member to the anchor means without being applied to the lightweight, frangible seat means. The backing or structural member may include means for rigidly connecting the seat means thereto. The structural member may be an inverted T-shaped plate of a width generally equal to the width of the seat means, with rows of holes for mounting the seat means and with slots therethrough for mounting straps of the restraint means and the anchor means.

BRIEF DESCRIPTION OF THE DRAWINGS

FIG. 1 is a fragmentary perspective view of a portion on the interior of a vehicle showing a seat therein, on which the improved child seat assembly is positioned and anchored by seat belts to the vehicle.

FIG. 2 is a fragmentary cross sectional view taken along the plane II—II of FIG. 1 showing the formed plastic seat, the belts and the straps, all mounted to the plate to form the assembly.

FIG. 3 is an elevational view of the plate of the improved child seat assembly, according to this invention.

DETAILED DESCRIPTION OF THE PREFERRED EMBODIMENT

Referring now to the drawings and particularly to FIG. 1, the improved child restraining seat assembly, according to this invention is generally denoted by the number 10. The assembly 10 is for use in a vehicle 11 having a seat 12 therein. Typically, the vehicle 11 will also have seat belts 13 with one end mounted to an anchor 14 on the vehicle floor, and with the other end mounting, either a buckle 15 or a tongue plate 16.

Generally, the child restraining seat assembly 10 includes a separate seat backing or structural member 20, formed seat means 25 for placement on the vehicle seat 12 to receive a child therein; fastener means 30 for mounting the formed seat means 25 to the structural member 20; restraint means 40 for wrapping about the child and for being secured together to hold the child in the seat means 25; anchor means 50 for connecting with the vehicle 11, and means 60 connecting the anchor means 50 and the restraint means 40 to the structural member 20 for transferring the restraining load of the restraint means 40 via the structural member 20 to the anchor means 50, without the load being applied to the formed seat means 25.

Referring now to FIG. 3, the separate structural member 20 of the preferred embodiment is an inverted T-shaped plate 21. The plate may be made of any suitable material which is strong enough to carry the loads that may be applied thereto and importantly, is provided with a wide, flat plate-like body portion to mount the associated child restraining or harness means so that the harness can not collapse about the child upon rapid vehicle deceleration. The separate structural member 20 also receives and mounts the lightweight molded seat means 25.

As best seen in FIG. 1, the seat means 25 for receiving a child therein includes a back 26, a bottom 27 and sides 28, all of which have a rounded outer lip 29. It is contemplated that the seat means 25 will be integrally molded out of lightweight plastic. However, such a plastic, because it is lightweight, would probably not be strong enough to itself carry the restraining loads of the restraining means 40 and so the structural member is provided. The formed seat means 25 is mounted to the structural member by mounting means 30.

Mounting means 30 are provided for mounting the formed seat means 25 to the separate structural member 20. In the preferred embodiment, the exemplary mounting means 30 include the provision of two rows of holes 31 in the seat back 26. The plate 21 also has two rows of holes 32 with similar spacing. A rivet 33 has its body 34 pushed through a hole 32 until the head 35 engages the seat back 26 so that the body 34 protrudes rearwardly therefrom. The protruding body 34 is pushed through a corresponding hole 31 in the structural member 20 to be headed over at 36 to mount the seat means 25 to the member 20.

Restraint means 40 are provided for wrapping about a child and for being secured together to hold the child in the seat means 25. As best seen in FIG. 1, the exemplary restraint means 40 include a crotch strap 41 having a buckle 42 mounted on one end and the other end free. The restraint means 40 as seen in FIGS. 1 and 2 also illustratively includes a continuous right and left combined shoulder and lap strap 43. The strap 43 has a pair of intermediate buckles 44 thereon for latching to the buckle 42 of the crotch strap 41 and has a pair of adjusting rings 45 for adjusting the length of the strap 43 to fit an individual child.

Anchor means 50 are provided for connecting the member 20 to the vehicle 11 and in the preferred embodiment include right and left belts 51. The belts 51, each have a buckle 52 on one end thereof, which latchingly mates with a respective tongue plate 53. Each tongue plate 53 is slotted so that a seat belt 13 can be doubled over and inserted into and through the slots to receive a pin 54. The pin 54 keeps the doubled over belt 13 from pulling out of the tongue plate 53. Other types of anchor means 50 (not illustrated) may include the use of connectors on the belts 51 for mating with the connectors on the seat belts 13 or the use of connectors on the plate 21 for joining directly to the seat belts 13. Regardless of what type of anchor means 50 is used, connecting means 60 must be provided.

Means 60 are provided for connecting the anchor means 50 and the restraint means 40 to the separate structural member 20 for transferring the load of the restraining means 40 via the member 20 to the anchor means 50 without the load being applied to the formed seat means 25. In the preferred embodiment, the connecting means 60, as best seen in FIG. 3, include the provision of a right upper slot 61, a left upper slot 62, a right side slot 63, a left side slot 64 and a lower slot 65 in the plate 21. The seat means 25 also has corresponding slots 71, 72, 73, 74, and 75. The non-buckle end of the crotch strap is inserted through the slot 75 in the formed seat means 25 and into the lower slot 65 to be folded over the adjacent marginal portion of the plate and sewn to itself. The continuous right and left shoulder and lap strap 43 is inserted through the right side slot 63 to pass behind the plate 21 to be inserted through the left side slot 64 and centered on the plate 21. The free ends of the strap 43 are passed through the respective side slots 73 and 74 in the formed seat means 25 and through the buckles 44. Thereafter, the free ends of the strap 43 are passed through the adjusting rings 45, through the respective slots 71 and 72, through the slots 61 and 62 to be folded over the adjacent marginal portions of the plate. The free ends are returned through the respective slots 71 and 72 to be inserted through the adjusting rings 45. By sliding the free ends of the strap 43, the effective length of the strap 43 can be changed and by sliding the buckles 44 on the strap 43, they can be properly located to hook onto the buckle 42 of the crotch strap 41.

Each belt 51 of the anchor means 50 is inserted through a respective side slot 63 or 64 to be folded over the adjacent marginal portion of the plate 21 and to be sewn to itself. The improved child restraining seat assembly 10 is now ready to be positioned in the vehicle 11.

As best seen in FIG. 1, the improved child restraining safety seat 10 is positioned on the seat 12 of the vehicle 11 with the belts 51 extending oppositely to join the buckles 52 to adjacent tongue plates 53 mounted on the seat belts 13. The child is placed in the seat assembly 10 and the buckles 44 joined to buckle 42 to wrap the straps 43 and 41 about the child. If need be, the ends of strap 43 can be slid in the rings 45 to adjust the straps 43 and 41 to fit the child snugly. The child will be held in the assembly 10 until released.

In the event of an accident or other sudden stop, the intertia of the child due to the motion of the vehicle will move the child forward into the straps 41 and 43 to apply a restraining load thereto. The restraining load on the straps 41 and 43 is applied to the wide plate 21 to attempt to move the plate 21 forward. The belts 51 connected to the plate 21 and to the seat belts 13 prevent the plate 21 from moving to transfer the restraining load of the straps 41 and 43 via the plate 21 to the belts 51. Because of the provision of the plate 21, no restraining load is applied to the formed seat means 25 and, because of the approximate child body width of the plate 21, the harness or restraint means does not collapse about the child to localize total loading in any one place on the torso.

To release the child, the buckles 44 are disconnected from the buckle 42. To remove the seat assembly 10, the buckles 52 are released and if so desired, the pins 54 removed, and the tongue plates pulled from the seat belts 13 to completely free all of the parts of the seat assembly 10 from the vehicle 11.

Thus, the improved child restraining seat assembly 10, according to this invention, meets all of the aforementioned objects to provide a novel structure whose definition is limited only by the following claims.

We claim:

1. An improved child's restraining seat assembly for use in a vehicle having a seat provided therein, said assembly including seat means for placement on the vehicle seat to receive a child therein, restraint means for wrapping about the child and for being secured together to hold the child in the seat means, and anchor means for connecting with the vehicle, the improvement comprising the provision of:

a separate structural member including a body plate having a width generally equal to that of the back of said seat means and means for connecting the anchor means and the restraint means thereto, said structural member being provided so that it transfers the restraining load of the restraint means to the anchor means without applying the load to the seat means;

means for mounting strap ends of said restraint means to said structural member at spaced-apart locations thereon to maintain said restraint means properly provided about a child in said seat means even under loading thereof; and wherein said connecting means includes the provision of suitable openings in said plate and seat means through which the anchor means and the restraint means extend to be connected to the plate;

the restraint means includes a plurality of straps with mating buckles thereon, and wherein the plate includes a number of slots formed therein, adjacent the edges thereof, said slots receiving the straps to mount them to the plate; and the straps include a crotch strap, and a continuous right and left combined shoulder and lap strap, and wherein the plate includes five slots, two upper slots adjacent the upper edge, a side slot adjacent each side edge and a lower slot centrally located adjacent the lower edge, said crotch strap extending through the lower slot, to be mounted to the plate, said combined shoulder and lap straps extending through respective side slots to be mounted to the plate, passing through respective upper slots, and being adjustably secured together, said combined shoulder and lap strap having intermediate buckles releasably secured to a buckle on the crotch strap to wrap about the child and restrain him.

2. The invention as in claim 1 wherein the plate has an inverted T shape.

3. The invention as in claim 1 wherein the anchor means includes right and left belts, said right and left belts extending through the respective side slots to be mounted to the plate.

* * * * *